July 11, 1939.  A. KREIDLER  2,165,711
EXTRUSION PRESS
Filed Oct. 31, 1935
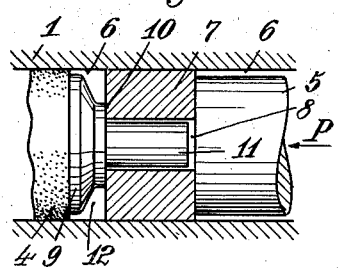
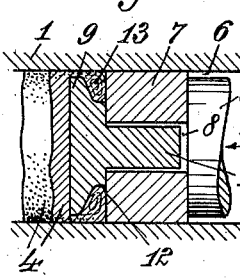
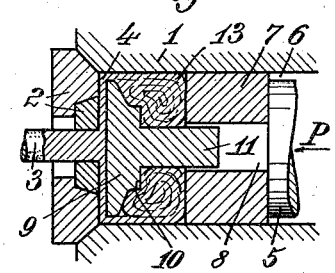
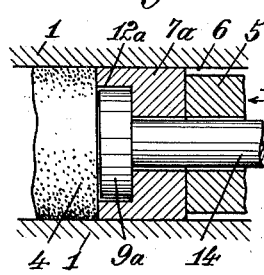
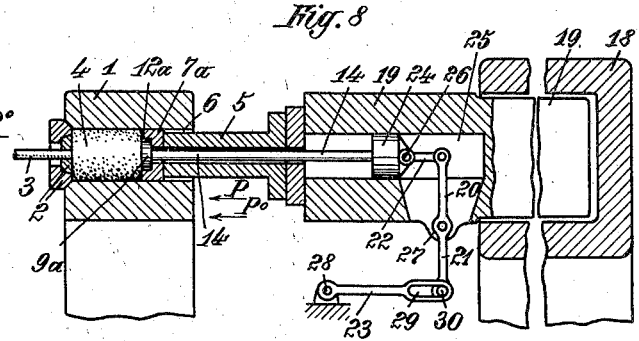
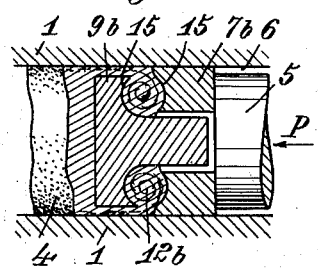
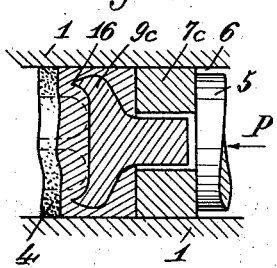
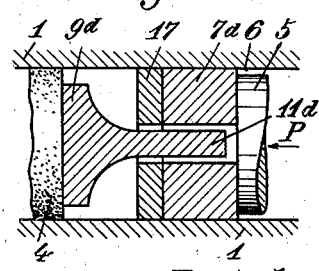
Inventor:
Alfred Kreidler
by
Paul Ferchland
Attorney Patented July 11, 1939

2,165,711

UNITED STATES PATENT OFFICE 2,165,711

EXTRUSION PRESS

Alfred Kreidler, Stuttgart, Germany

Application October 31, 1935, Serial No. 48,554
In Germany October 31, 1934

4 Claims. (Cl. 207—2)

This invention relates to improvements in extrusion presses.

In such presses, especially for producing metallic bodies by extrusion, a great quantity of waste is produced in as much as the superficial layer of the ingots, which is usually contaminated or deteriorated by oxides, evaporations or blow holes, accumulates before the plunger and is admixed to the extruded material towards the end of the pressing operation. Hereby a certain portion of the pressed ware is infected with a relatively small impure interior zone and on this account must be thrown away as waste. The waste of valuable material produced by this relatively small core of infected material is considerable.

In order to separate the contaminated outer layer from the non-contaminated part of the ingot it has been proposed to use a pressing head having a smaller diameter than the receiver (and the ingot) so that the outer layer is left behind in the receiver in form of a sleeve. In this case the head has no guide in the receiver over a length at least equal to the length of the sleeve, and on this account it often happened that the head assumed an eccentric position in the receiver so that parts of the outer layer were extruded together with the non-contaminated material thereby deteriorating the product. On the other hand it has been proposed to provide the plunger with a head having a somewhat smaller diameter at its end than the plunger and moreover tapering to the rear so as to produce an empty space in which the outer layer could accumulate.

Now the object of the present invention is to provide an extrusion process and means for carrying out the same by which the material of the outer layer of the ingot contaminated by oxides, evaporations or the like or deteriorated by blow-holes is substantially or wholly prevented from flowing into the core. This is attained by inserting before the head of the plunger a fore-disk having a smaller cross-section or diameter than the receiver, whereby the contaminated material of the heated ingot is separated from the material of the non-contaminated core of the ingot and is made to flow in a plastic state over the edge of the fore-disk. The material thus separated by the fore-disk is conducted behind the same and is collected in the space between the fore-disk and the plunger. Hereby the material of the contaminated outer zone is prevented from accumulating in front of the fore-disk, then flowing into the stream-line of the non-contaminated material of the core, and thereby contaminating the final product.

To improve the result of this method the fore-disk is preferably heated before or/and during the pressing operation to a temperature higher than that of the pressing head and accommodated to or approaching that of the ingot. In some cases a further highly heated disk may be inserted before the pressing head so that the separated contaminated material is carried between well tempered parts to prevent its rapid solidification. This expedient is of especial importance because when omitting it the material accumulating behind the fore-disk would harden between two cool disks and offer an enormous resistance to the following material. The insertion of a thin highly heated disk before the pressing head is advantageous because the head itself when heated to the same temperature as the fore-disk would not withstand the pressure to be applied.

The difference between the radius or cross-section of the fore-disk and the inner radius or cross-section of the receiver should be accommodated to the number, shape and cross-section of the matrices, to the pressure to be applied and to the thickness of the contaminated outer layer of the ingot. This difference must at least be approximately equal or must be superior to the thickness of the impure outer layer of the ingot (before or during the pressing operation).

The invention will now be more fully described in connection with the annexed drawing of which—

Fig. 1 is partly an elevation, partly a vertical longitudinal cross-section of a device for carrying out the invention;

Fig. 2 is a similar view showing the "fore-disk" and part of the ingot in cross-section at the beginning of the pressing operation;

Fig. 3 is a corresponding view showing the device at the end of the operation;

Fig. 4 is a view, partly in cross-section, showing the "fore-disk" embedded into a cavity in the pressing head, and means for advancing the fore-disk with greater speed than the pressing head;

Figs. 5 to 7 show modifications in shape of the fore-disk or the pressing head;

Fig. 8 is on a reduced scale, a cross-sectional view showing an extrusion press provided with the implement shown in Fig. 4.

In Figs. 1 to 3 I is the wall of a receiver, 2 is the matrix through which the rod or stick 3 is pressed out of the heated ingot 4. 5 is the plunger of a hydraulic or other press moving in the bore 6 of the receiver and carrying a head piece 7. The head piece 7 may have the same or a somewhat smaller diameter than the bore 6, as usual in extrusion presses. In a central cylindrical bore 8 of the head piece 7 a fungiform disk 9 is guided having a somewhat smaller diameter than the head 7 or the bore 6 of the receiver and bearing against the head 7 with a neck 10. The disk 9 carries a stud 11 loosely engaging the bore 8. For extruding the plastic material from the ingot 4 the plunger is advanced in the direction of the arrow P.

Fig. 1 shows the position of the single parts in the beginning of the pressing operation, the annular space 12 included between the rear face of member 9, the wall 1 and the front face of the head 7 still being empty. Fig. 2 shows the position of the parts at the beginning, and Fig. 3 illustrates the position at the end of the pressing operation.

The device operates as follows: By advancing the parts 7 and 9 at first the space 12 is filled with metal cut out, as it were, from the ingot 4 by the edge of the disk 9. Hereby the impure outer layer of the ingot is separated from the valuable material of the interior of the ingot and removed rearwards behind the front face of part 9. The impure material is, so to speak, wound up in the space 12, as indicated at 13 in Figs. 2 and 3. On further continuing the pressing operation, the lines of flow dammed at the pressing disk are continuously separated by the fore-disk 9 into lines indicating the way of the non-contaminated and lines indicating the way of the contaminated material, the latter being, so to speak, cut off from the pure core-portion and collected in the space 12. According to the volume of the metal received the fungiform disk 9 retires from the head 9 whereby the space 12 automatically increases. During this movement the stud 11 is guided by the bore 8 of the head 7 so that the disk 9 is always equally spaced from the wall 1.

Thus the disk 9, so to speak, intercalates itself into the flow of the plastic material 4; it does not change by force the direction of the flow, but flows, as it were, along with the metal flow, merely separating the contaminated outer layer from the valuable core of the ingot 9 by intervening between them. At the end of the pressing operation the whole of the contaminated outer layer of the ingot 4 has, as it were, wound itself up behind the fungiform disk 9 in the enlarged space 12, as shown in Fig. 3 at 13, whereas only valuable material, i. e., material free from blowholes, has been extruded to form the stick 3.

Fig. 4 shows a modification in which the disk 9ª is initially countersunk in a cavity 12ª of the head 7ª. The disk 9ª is carried by a second plunger 14 which is mechanically advanced in the direction of the arrow P°. The plunger 14 may be actuated hydraulically in the same way as the plunger 5 by means of a cylinder containing a piston or otherwise. The single parts of this modification may also be carried out in accordance with the other modifications shown. As to the drive of the plungers 5 and 14 see the description of Fig. 8 below.

The operation of the modification shown in Fig. 4 is as follows:

After the ingot 4 has been introduced into the bore 6 of the receiver, the plunger 5 forces the head 7ª forward, the latter taking along with it the disk 9ª. Immediately after the beginning of the pressing operation the plunger 14 begins to go in advance of the plunger 5, thereby advancing the disk 9ª with respect to the head 7ª. Hereby the flow of the material is again divided and a free space 12ª is formed for receiving the contaminated outer layer of the ingot 4. In Fig. 5 the disk 9ᵇ and the head 7ᵇ are shown to be provided with vaulted cavities 15 whereby the winding up of the outer layer of the ingot 4 in the space 12ᵇ is facilitated. The delineation substantially corresponds to that of Figs. 1 to 4, but it is understood that the vaulted cavities may also be employed in connection with the other modifications shown. In some cases it suffices to provide vaulted cavities in the head 7 only.

In Fig. 6 the front edge 16 of the disk 9ᶜ is shaped to form a wedge or knife to attain a sharp separation between the flow of the bad outer layer and the valuable core of the ingot 4, the flow of the valuable core being indicated by dotted lines. 7ᶜ is the head. The wedge-like edge of the disk 9ᶜ may be advantageously employed in connection with the other modifications shown.

In Fig. 7 a disk 17 is placed before the head 7ᵈ before introducing the fungiform disk 9ᵈ with its stud 11ᵈ into the bore of the head 7ᵈ. The disks 17 and 9ᵈ are introduced into the receiver in a highly heated state, as mentioned before. This measure may also be applied to the modifications illustrated in Figs. 1 to 6.

Fig. 8 is a diagram showing a hydraulic press equipped with the implement illustrated in Fig. 4. Reference letters 1 to 7, 7ª, 9ª, 12ª and 14 designate the same parts as in Fig. 4. The cylinder 18 contains a piston 19 bearing the plunger 5. By introducing water under pressure into the cylinder 18 the plunger 5 with its head 7ª is pressed against the ingot 4 so that the rod or stick 3 is extruded through the matrix 2.

During the first half of the pressing stroke the head 7ª takes along with it in the direction of the arrow P° the disk 9ª, including the plunger 14, because the disk 9ª contacts with the head 7ª. This movement is not prevented by the link-work 20, 21, 22, 23 to be described hereafter.

The plunger 14 carries at its rear end a guiding piece 24 adapted to slide in the axial bore 25 of the piston 19. A double-armed lever 20, 21 is linked to the said piece 24 at 26 by a swing arm 22. The lever 20, 21 is fulcrumed in a projection 27 of the piston 19. The other end of the lever 20, 21 cooperates with an arm 23 fulcrumed at a point 28 fixed on the frame of the press. This arm 23 is provided with a longitudinal slot 29 which is located horizontally during the first half of stroke of the piston, so that, as already mentioned, the disk 9ª is not influenced by the linkwork in the meantime, the double-armed lever 20, 21 moving by its pivot with the piston 19 without any rotation around this pivot, because the free end of its arm 21 then freely slides in the horizontal slot 29 of the arm 23.

After the first half of the stroke has been finished, the arm 21 strikes with its end 30 guided in the slot 29 on the substantially horizontal arm 23 at the end of the slot and is thereby retained. From this moment the double-armed lever 20, 21 is turned around its pivot while the stroke of the head 7a is continued, whereby the disk 9a goes in advance of the head 7a according to the position of the fulcrum of the lever 20, 21.

If it is desired to make the disk 9a advance already at a prior point of the stroke, the slot is shortened at its end turned towards the fixed fulcrum 28 of the arm 30 which may easily be effected by means of a set-screw.

The invention is also applicable to the so-called reversed extrusion process in which the matrix is moved towards the ingot and exerts the pressure on it, whereas the rear end of the receiver is closed.

I claim:

1. In an extrusion press a receiver, a piston closing one end of the receiver, an extrusion die at the other end of the receiver, a loose disk between the piston and the die of such diameter that the volume of the space between disk and piston when the two are in contact is considerably exceeded by the volume of a body having the length of the stroke and being bounded by an outer cylinder having the diameter of the receiver and an inner cylinder having the diameter of the said disk, and means for guiding the said disk in the piston, whereby on advancing the piston the contaminated metal is gradually forced into the space between the disk and the piston and after this space has been filled the disk is caused to move along with the extruded metal.

2. In an extrusion press a receiver, a piston comprising a plunger and a head piece closing one end of the receiver, an extrusion die at the other end of the receiver, a loose disk between the piston and the die of such diameter that the volume of the space between disk and piston when the two are in contact is considerably exceeded by the volume of a body having the length of the stroke and being bounded by an outer cylinder having the diameter of the receiver and an inner cylinder having the diameter of the said disk, and means for guiding the said disk in the piston, whereby on advancing the piston the contaminated metal is gradually forced into the space between the disk and the piston and after this space has been filled the disk is caused to move along with the extruded metal.

3. In an extrusion press a receiver, a piston closing one end of the receiver, an extrusion die at the other end of the receiver, a loose disk between the piston and the die of such diameter that the volume of the space between disk and piston when the two are in contact is considerably exceeded by the volume of a body having the length of the stroke and being bounded by an outer cylinder having the diameter of the receiver and an inner cylinder having the diameter of the said disk, and a plunger integral with the said disk guided in a corresponding bore of the piston, whereby on advancing the piston the contaminated metal is gradually forced into the space between the disk and the piston and after this space has been filled the disk is caused to move along with the extruded metal.

4. In an extrusion press a receiver, a piston closing one end of the receiver, an extrusion die at the other end of the receiver, a loose disk between the piston and the die of such diameter that the volume of the space between disk and piston when the two are in contact is considerably exceeded by the volume of a body having the length of the stroke and being bounded by an outer cylinder having the diameter of the receiver and an inner cylinder having the diameter of the said disk, and a plunger integral with the said disk guided in a corresponding bore of the piston, which in addition is formed to receive also the disk, whereby on advancing the piston the contaminated metal is gradually forced into the space between the disk and the piston and after this space has been filled the disk is caused to move along with the extruded metal.

ALFRED KREIDLER.